United States Patent [19]

Muranaka et al.

[11] 4,364,259
[45] Dec. 21, 1982

[54] VIBRATION SENSOR FOR AN AUTOMOTIVE VEHICLE ENGINE

[75] Inventors: Shigeo Muranaka; Michio Onoda, both of Yokohama, Japan

[73] Assignee: Nissan Motor Company, Ltd., Yokohama, Japan

[21] Appl. No.: 166,946

[22] Filed: Jul. 8, 1980

[30] Foreign Application Priority Data

Jul. 13, 1979 [JP] Japan ................................. 54-88941

[51] Int. Cl.³ ............................................. G01L 23/22
[52] U.S. Cl. ....................................... 73/35; 310/329; 73/654
[58] Field of Search ........................... 73/35, 649, 654; 310/328, 329, 330, 332, 340, 348, 354, 356; 29/580, 588, 589, 25.35

[56] References Cited

U.S. PATENT DOCUMENTS

| | | | |
|---|---|---|---|
| 3,252,016 | 5/1966 | Hayer et al. | 310/329 |
| 3,351,393 | 11/1967 | Emmerich | 310/332 |
| 3,650,003 | 3/1972 | Toyoshima | 29/588 |
| 4,103,264 | 7/1978 | Howatt et al. | 310/340 |

*Primary Examiner*—James J. Gill
*Attorney, Agent, or Firm*—Thompson, Birch, Gauthier & Samuels

[57] ABSTRACT

A vibration sensor for an automotive vehicle having a piezoelectric element of diaphragm type for detecting mechanical vibrations from an internal combustion engine such as knocking frequency. The piezoelectric element is formed within a holder of plastic or the like and bonded thereto in a manner to accurately regulate the clamping pressure at the element periphery and regulate the vibration area thereof to accurately regulate the resonant frequency of the vibration sensor.

5 Claims, 11 Drawing Figures

VIBRATION SENSOR FOR AN AUTOMOTIVE VEHICLE ENGINE

BACKGROUND OF THE INVENTION

1. Field of the Invention

The present invention relates generally to a vibration sensor for an automotive vehicle which can detect mechanical vibrations generated from an internal combustion engine, such as knocking, and more specifically to a vibration sensor for an automotive vehicle having a piezoelectric vibration element mounted therein in diaphragm fashion.

2. Description of the Prior Art

In general, if an engine operates with strong knocking for a long time, the knocking will have an undesired effect on the durability or other characteristics of the engine but, if the knocking is faint at relatively low engine speeds, the knocking will have a favorable effect on the characteristics of engine torque and fuel consumption rate. Heretofore, various systems have been proposed which can regulate engine spark timing in accordance with engine knocking to maintain a faint knocking at all times, improving the engine torque and fuel consumption rate. This is because engine spark timing has a close relationship to engine knocking conditions.

In such a system, a vibration sensor is indispensable for detecting enging knocking and vibration.

Conventionally, a circular sheet piezoelectric element has been used as a vibration sensor. The element is laid on a concave portion of a housing, its periphery being clamped by a flange portion of an electrode and the concave portion of the housing. When the vibration sensor of this type is attached to the engine, it vibrates in diaphragm fashion according to the vibration transmitted from the engine. The resonant frequency of the diaphragm vibrator is determined chiefly by the diameter of the diaphragm portion of the vibrator and by the clamping pressure applied to the diaphragm vibrator.

Therefore, selecting the diameter of the diaphragm portion is very critical so that the resonant frequency range is within the region of an ordinary engine knocking frequency between 5 and 9 KHz.

As a result, the assembly operation of such vibrators is time consuming and requires high dimensional precision.

BRIEF SUMMARY OF THE INVENTION

In a vibration sensor having a vibrator which consists essentially of a disc-shaped piezoelectric element or elements with a diameter of D and a pair of electrodes for detecting a potential difference caused by vibration in diaphragm fashion of the vibrator, in order to make the resonant frequency of the vibration sensor correspond to a knocking frequency of an internal combustion engine, an enclosure of the disc is molded together with the periphery of the disc to maintain a clamping pressure of the vibrator constant for determining the resonant frequency of the vibrator.

BRIEF DESCRIPTION OF THE DRAWINGS

The features and advantages of the vibration sensor according to the present invention will be more clearly appreciated from the following description taken in conjunction with the accompanying drawings in which like reference numerals designate corresponding elements, and in which.

DETAILED DESCRIPTION OF THE INVENTION

Figure 1:
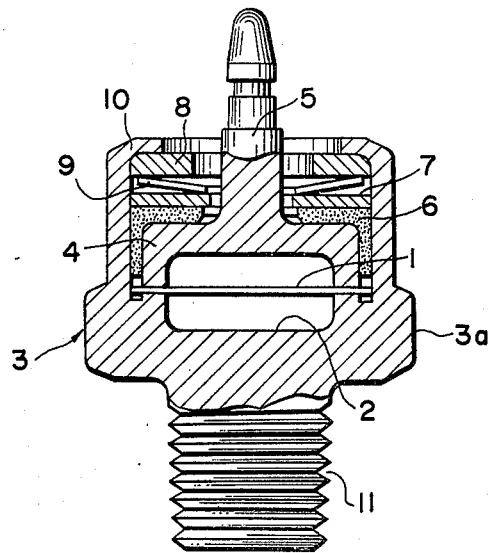
FIG. 1 is a cross-sectional view of a conventional vibration sensor.

To facilitate understanding of the present invention, a brief reference will be made to a conventional vibration sensor for an automotive vehicle. Referring to FIG. 1, numeral 1 denotes a thin, circular diaphragm vibrator made of a piezoelectric element, both surfaces of which are coated by, for example, silver to form electrode surfaces.

The vibrator 1 is housed in a housing 3 having a concave portion 2, and is clamped by an electrode 5 having a flange 4 to form another concave portion. One of the electrode surfaces of the vibrator 1 is connected to the conductive housing 3; the other is connected to the electrode 5 only.

In order to fix the diaphragm vibrator 1 under a constant clamping force, a dish-shaped spring 9 is positioned between a spring sheet 7 and a retainer 8. Numeral 6 denotes an insulating substance. The retainer 8 is fixed by bending inward the cylindrical housing end to form a flange 10.

The vibrator 1 is clamped under almost constant pressure by means of an elastic force exerted by the dish-shaped spring 9 so that the resonant frequency of the vibrator can be maintained constant. In addition, the inner diameter of the housing concave portion 2 is equal to that of the electrode, so that the internal diameters clamping the vibrator 1 on each side coincide. In this case, the clamping internal diameter is determined so that the resonant frequency of the vibrator 1 is within ordinary engine knocking frequencies between 5 and 9 KHz.

The vibration sensor thus constructed is fixed onto an engine body with an anchor bolt 11 integrally formed with the housing 3. Furthermore, the base portion 3a of the housing 3 is hexagonal in shape for easy grasping with conventional mechanic's tools.

When the vibrator 1 begins to vibrate, a potential difference is created between two electrode surfaces of the piezoelectric element in accordance with the deformation rate of the vibrator. Since one electrode surface is grounded through the housing 3, the vibration of the vibrator 1 can be converted electrically into a corresponding voltage between the electrode 5 and the body ground. Furthermore, since the vibrator 1 is so designed to resonate within a knocking frequency range of an engine, it is possible to detect knocking vibration efficiently and accurately.

However, the vibrator of this type has the following shortcomings: Since the resonant frequency of the vibrator varies remarkably with changes in the internal diameter D and the clamping pressure, a high dimensional precision has been required during its assembly, thus resulting in a low productivity of the vibrator.

Because of the relatively narrow range in which the resonant frequency reaches its peak, the accuracy of regulating the resonant frequency has a remarkable influence on the precision of engine knocking detection.

Figure 2:
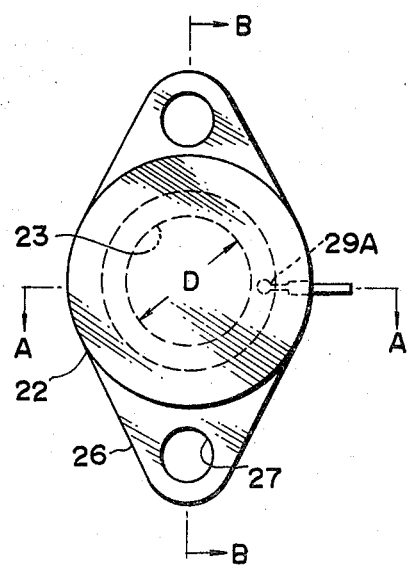
FIG. 2 is a top view of a first embodiment of the present invention.
Figure 3:
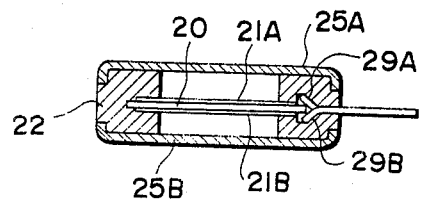
FIG. 3 is a cross-sectional view taken through line A—A in FIG. 2.
Figure 4:
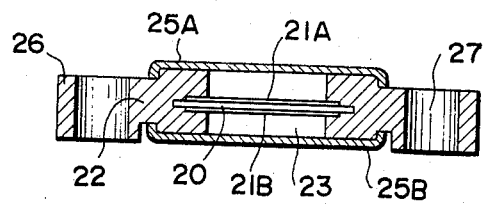
FIG. 4 is a cross-sectional view taken through line B—B in FIG. 2.

In a first embodiment of the present invention shown in FIGS. 2, 3 and 4, numeral 20 designates a vibrator made of a piezoelectric element, at both sides of which two electrodes 21A and 21B are coated. The vibrator 20 is fixed with its peripheral portion integrally embedded in a holder 22 formed by the injection molding of a synthetic resin.

The central portion of the holder 22 is formed with a circular cavity 23 in which the vibrator 20 is supported. Both sides of the cavity 23 are tightly sealed with holder covers 25A and 25B. Each bracket 26 of the holder 22 is provided with a mounting hole 27. Lead wires 29A and 29B are connected to the electrodes 21A and 21B by soldering, or in any conventional manner. Such soldered portion is also embedded within the holder 22 and its lead wires 29A and 29B are extended outwardly therefrom.

Figure 5:
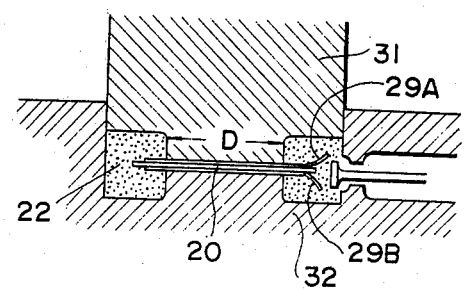
FIG. 5 is an explanatory view of an injection mold for forming the present invention.
Figure 6A:
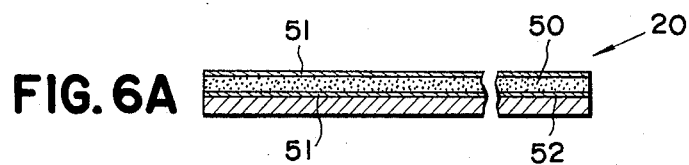
FIGS. 6 (A) through (D) are various modifications of the vibrator arrangement.
Figure 6B:
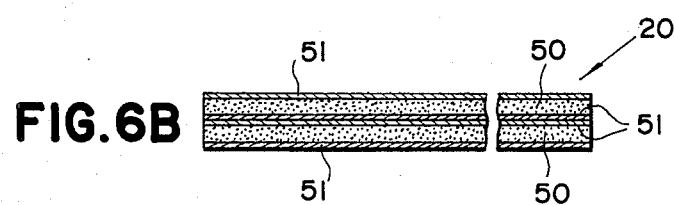
Figure 6C:
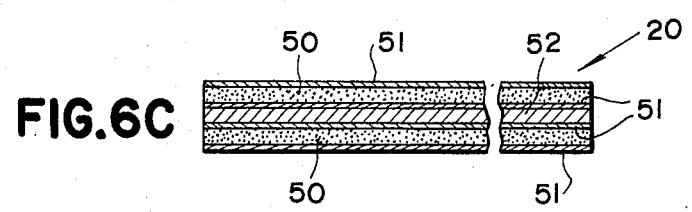
Figure 6D:
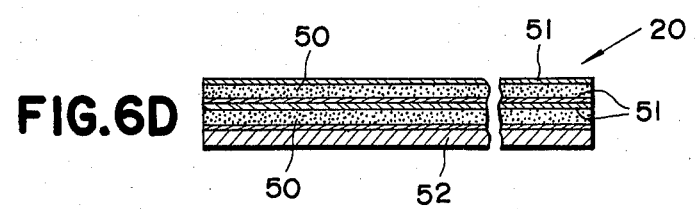

As shown in FIG. 5, with the vibrator 20 connected to the lead wires 29A and 29B, the vibrator 20 is positioned between a pair of molds 31 and 32 and fixed on the holder cover formed by injection molding. Since the internal diameter of the cavity 23 in the holder 22 corresponds to the diameter D of the vibrator 20 and the resonant frequency of the vibrator is determined partially by the diameter D, it is essential to control the dimensional accuracy of the pair of molds 31 and 32, taking into account the shrinkage of the holder 22 after cooling. In this way the vibrator 20 is molded with the holder 22 so that the periphery of the vibrator body 20 is held by the bonding force generated by solidifying the synthetic resin from the liquid state. The clamping pressure can usually be regulated to a substantially constant value, unlike the mechanical clamping of the prior art devices. Consequently, the resonant frequency of the vibrator 20 can be set accurately to the knocking frequency. The vibrator 20 produced as described above has an excellent application to mass production and also results in a reduced failure rate because of the bonding between the vibrator 20 and the holder 22 resulting from the injection molding process.

Although in the above example, the vibrator 20 is shown as a thin, circular piezoelectric element having an electrode formed by silver coating bonded to each side thereof, various examples shown in FIGS. 6 (A) to (D) may be used alternatively.

In FIG. 6 (A) a disc-shaped metal 52 is adhered to one of the electrodes 51 of the vibrator 20 by means of conductive adhesive for reinforcing the vibrator.

In FIG. 6 (B) the vibrator 20 comprises two piezoelectric elements 50 adhered to each other (so called, "Bimorph") at the two electrodes which have the same polarity.

In FIG. 6 (C) the vibrator 20 comprises a disc-shaped metal 52 positioned between two piezoelectric elements to increase the output voltage between the electrodes as well as reinforce the vibrator 20.

In FIG. 6 (D) the vibrator 20 comprises a pair of piezoelectric elements 50 bonded to each other, as in FIG. 6 (B), further bonded to a disc-shaped metal 52, as in FIG. 6 (A), for reinforcement.

Figure 7:
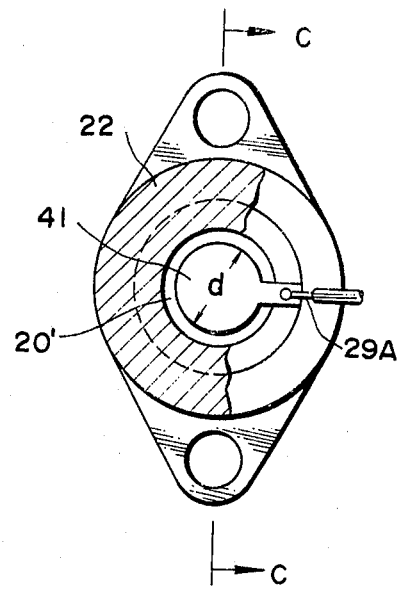
FIG. 7 is a partial cross-sectional view of a second embodiment of the present invention.
Figure 8:
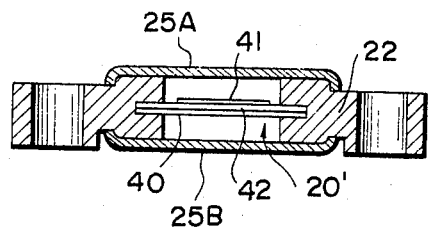
FIG. 8 is a cross-sectional view taken through line C—C in FIG. 7.

In FIG. 7 and FIG. 8, there is shown a second embodiment of the present invention in which the diameter of an electrode 41 positioned at the upper surface of the vibrator 20' is reduced to increase the output voltage generated by the diaphragm vibration. Numeral 40 denotes a disc-shaped metal electrode bonded to the piezoelectric vibration element 42. Positioning a smaller electrode on the vibrator increases the mass of the vibrator at the center thereof, and also reduces the rigidity of the vibrator by having less material bonded to the holder 22. This results in more movement in response to a vibration input of a specified amplitude (i.e. greater sensitivity) in this second embodiment of the sensor of the present invention, than in prior art devices.

The direction of shear stress developed by the diaphragm vibration changes at the points of inflection on the elastic curve of the vibrator 20'. Therefore, if the diameter of the electrode 41 is chosen to be equal to or smaller than the diameter of the vibrator 20' that is in the region of shear stress in the same direction, the output from the piezoelectric vibrator increases because the additional mass increases the stress in one direction only and is not cancelled by that of the opposite direction.

It will now be appreciated from the foregoing description that the vibrator according to the present invention is advantageous in that the vibrator is bonded with the molded housing of the vibrator at its periphery, resulting in a uniform clamping pressure at the periphery of the vibrator element and accurate dimensional tolerances determining the internal diameter of the vibrator element, thus accurately regulating the resonant frequency of the vibration sensor.

What is claimed is:

1. A vibration sensor for an automotive vehicle engine comprising:
   (a) a piezoelectric disc, a first disc-shaped metal electrode co-axially affixed to one surface of and having substantially the same diameter as said piezoelectric disc, a second disc-shaped metal electrode co-axially affixed to the other surface of and having a smaller diameter than said piezoelectric disc to increase the diaphragm vibration sensitivity of the vibration sensor;
   (b) a holder for said piezoelectric disc including means for mounting said holder on the vehicle engine, said holder being formed and bonded around the peripheral edge of said piezoelectric disc and being made of a material which contracts during the bonding process to apply sustained compressional force to said piezoelectric disc; and
   (c) a pair of protective covers affixed to both sides of said holder, said covers sandwiching and covering said piezoelectric disc and being spaced therefrom to provide cavities adjacent both sides of said piezoelectric disc.

2. The vibration sensor of claim 1 further having a metal disc bonded to said first disc-shaped metal electrode, said metal disc having substantially the same diameter as said first electrode.

3. The vibration sensor of claim 1 wherein the diameter of said second disc-shaped metal electrode is approximately one-half the diameter of the vibrating surface of said piezoelectric disc.

4. The vibration sensor of claim 1 wherein said holder is formed by the injection molding of synthetic resin material.

5. The vibration sensor of claim 4 wherein said piezoelectric disc is embedded in said holder during the injection molding process to form an integral molding.

* * * * *